United States Patent
Sakano et al.

(10) Patent No.: US 7,480,257 B2
(45) Date of Patent: Jan. 20, 2009

(54) IP TELEPHONE TERMINAL SEARCHING FOR A DESTINATION WITH A TELEPHONE NUMBER TO SET UP A CALL CONNECTION OVER AN IP NETWORK

(75) Inventors: Tsuneyuki Sakano, Yokohama (JP); Yoshinori Sekine, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 1073 days.

(21) Appl. No.: 10/298,671

(22) Filed: Nov. 19, 2002

(65) Prior Publication Data

US 2003/0095546 A1   May 22, 2003

(30) Foreign Application Priority Data

Nov. 20, 2001   (JP) ............................. 2001-353930

(51) Int. Cl.
   *H04L 12/56* (2006.01)
(52) U.S. Cl. .................... 370/255; 370/356
(58) Field of Classification Search ................ 370/352, 370/356, 401, 475, 410, 254, 255, 256, 257, 370/258
   See application file for complete search history.

(56) References Cited

U.S. PATENT DOCUMENTS

| 3,818,663 | A | * | 6/1974 | Adlam | .................. 52/300 |
|---|---|---|---|---|---|
| 5,440,547 | A | | 8/1995 | Easki et al. | |
| 5,726,984 | A | * | 3/1998 | Kubler et al. | ............... 370/349 |
| 5,883,944 | A | | 3/1999 | Burke et al. | |
| 6,370,137 | B1 | * | 4/2002 | Lund | ........................ 370/352 |
| 6,389,010 | B1 | * | 5/2002 | Kubler et al. | ............... 370/353 |
| 6,556,565 | B1 | * | 4/2003 | Ward et al. | .................. 370/356 |
| 6,819,663 | B2 | * | 11/2004 | Komuro | ..................... 370/352 |
| 7,035,252 | B2 | * | 4/2006 | Cave et al. | .................. 370/356 |
| 7,085,257 | B1 | * | 8/2006 | Karves et al. | ............... 370/352 |
| 2005/0251577 | A1 | * | 11/2005 | Guo et al. | ................... 709/230 |
| 2006/0056388 | A1 | * | 3/2006 | Livingood | .................. 370/352 |
| 2007/0217595 | A1 | * | 9/2007 | Lee | ............................. 379/219 |
| 2007/0242626 | A1 | * | 10/2007 | Altberg et al. | .............. 370/259 |

FOREIGN PATENT DOCUMENTS

| JP | 6-318951 | 11/1994 |
|---|---|---|
| JP | 11-252180 | 9/1999 |

* cited by examiner

*Primary Examiner*—Melvin Marcelo
(74) *Attorney, Agent, or Firm*—Rabin & Berdo, P.C.

(57) ABSTRACT

An IP (Internet Protocol) telephone terminal includes a communication subsection transmitting and receiving data to and from one or more IP telephone terminals on a peer-to-peer connection over an IP network, and a search subsection comparing a telephone number received by the communication subsection with a telephone number allotted to the IP telephone terminal. When the result from comparison indicates a coincidence between both of the telephone numbers under comparison, the communication subsection transmits the IP address assigned thereto. The IP address thus transmitted efficiently allows a call connection to be set up from a calling telephone terminal having transmitted the telephone number.

12 Claims, 10 Drawing Sheets

IP TELEPHONE TERMINAL SEARCHING FOR A DESTINATION WITH A TELEPHONE NUMBER TO SET UP A CALL CONNECTION OVER AN IP NETWORK

BACKGROUND OF THE INVENTION

1. Field of the Invention

The present invention generally relates to an IP (Internet Protocol) telephone terminal and a method of searching for a destination for use in an IP network.

2. Description of the Background Art

Today, IP telephone terminals operative on the basis of VoIP (Voice over Internet Protocol) architecture are extensively used to accomplish telephonic conversation on the IP network. In VoIP systems, IP telephone terminals are allotted to IP addresses to be identified, thus requiring the IP address of a called IP telephone terminal in order to establish a call meant to the IP telephone terminal to be called. When calling, what is input to an IP telephone terminal is a telephone, i.e. subscriber, number of a called party or IP telephone terminal. In order to set up a call connection, a process is required for converting the telephone number of a called party to a corresponding IP address.

The standardized specifications H.323 of the ITU-T (International Telecommunication Union-Telecommunication Standardization Sector) regulates that a unit called gatekeeper perform the address conversion stated above. The gatekeeper holds a table listing the telephone numbers of IP telephone terminals which that gatekeeper controls and the IP addresses associated therewith.

How to set up a call from an IP telephone terminal to a called IP telephone terminal will generally follow the procedure as read below. At first, a connection is established from a calling terminal to a gatekeeper. After a connection has been established to the gatekeeper, the telephone number of a terminal to be called is entered into the calling terminal, being in turn transmitted to the gatekeeper. The gatekeeper finds out the IP address associated with the telephone number thus received and sends out the IP address to the calling terminal. The calling terminal receives the IP address from the gatekeeper and assembles an IP packet having its header including the IP address thus received. That IP packet, i.e. call connection request packet, is transmitted on the IP network to the called terminal.

The conventional system of setting up call connections in the way stated above requires the gatekeeper to store in its database the telephone numbers and the associated IP addresses of all the IP telephone terminals which that gatekeeper controls.

An increase of IP telephone terminals to be controlled by the gatekeeper gives rise to an extensive, huge amount of management data including the telephone numbers and IP addresses associated therewith in its database.

The gatekeeper, having such an extensive management database, would have to deal with too much communications traffic concentrated thereon, thus causing a difficulty that heavier traffic is incurred on the lines to the gatekeeper. In addition, the gatekeeper would have to conduct a search on the huge amount of data in its database for IP addresses associated with telephone numbers requested. That requires extensive time for searching and setting up calls over the network.

Moreover, it takes troublesome works to operate and maintain the database in which such a huge amount of data are stored so that dedicated operators or maintenance staff are required, thus expensive in maintaining or updating the database.

When such a single gatekeeper fails in searching on the database, entire call connections are also failed between IP telephone terminals.

SUMMARY OF THE INVENTION

It is an object of the present invention to provide an IP telephone terminal in which the difficulties are minimized which were encountered in the prior art stated above in connection with a database for searching for IP addresses, and an improved searching method in such IP telephone terminals.

An IP (Internet Protocol) telephone terminal in accordance with the present invention, includes a communication subsection transmitting and receiving data to and from one or more IP telephone terminals on a peer-to-peer connection over an IP network, and a search subsection comparing a telephone number received by the communication subsection with a telephone number allotted to the IP telephone terminal. When the result from comparison indicates a coincidence between both of the telephone numbers under comparison, the communication subsection transmits the IP address assigned thereto. The IP address thus transmitted allows a call connection to be set up from a calling telephone terminal having transmitted the telephone number.

In accordance with the present invention, a search for an IP telephone terminal is conducted by IP telephone terminals. That eliminates the provision of a gatekeeper for conducting such a search that was conventionally required.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 10:
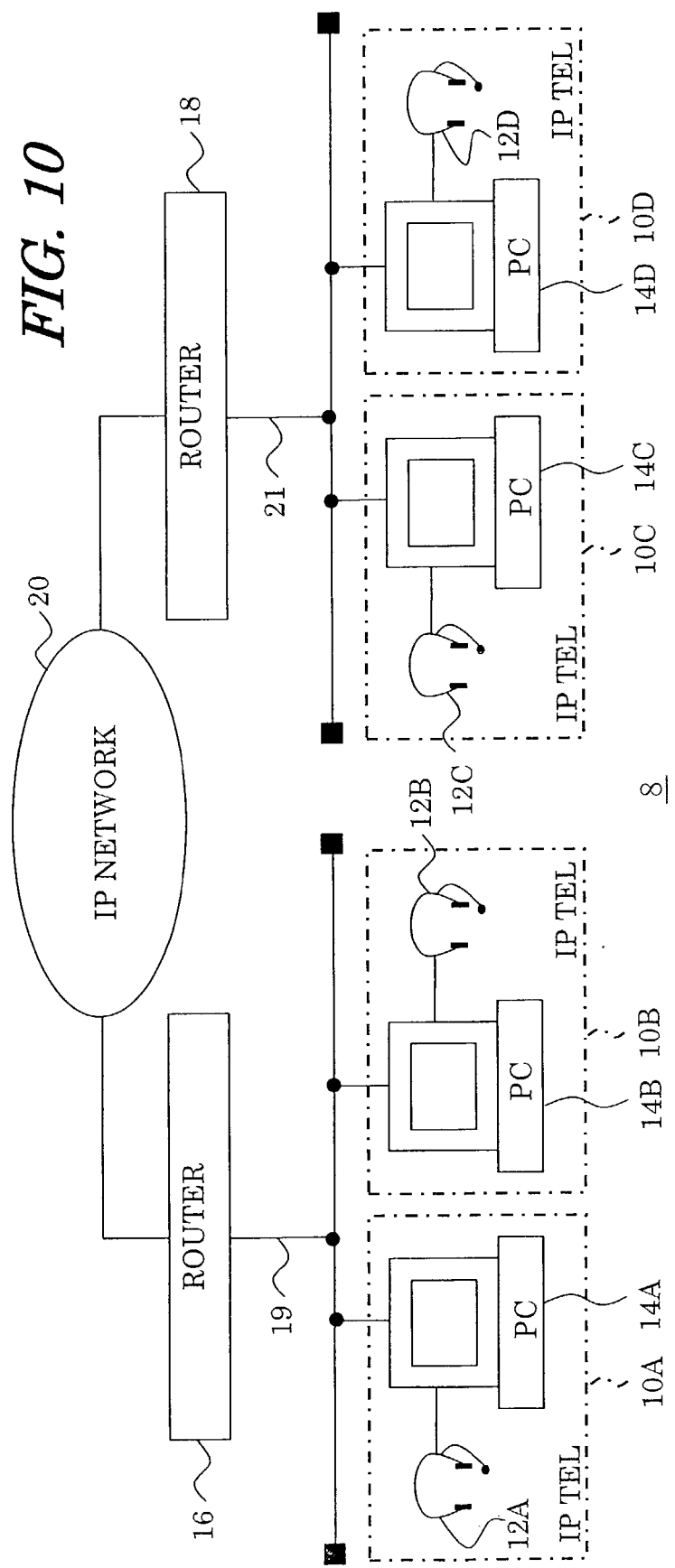
FIG. 10 schematically shows, like FIG. 9, an embodiment of an IP telephone terminal searching system including an IP telephone terminal searching system in accordance with the invention.

With reference to FIG. 10 first, a preferred embodiment of an IP telephone terminal searching system 8 to which applied is an IP telephone terminal in accordance with the present invention. The searching system 8 includes IP telephone terminals 10A through 10D. Although the system 10 usually includes a lot of IP telephone terminals, only four terminals 10A through 10D are depicted merely for the simplicity reason. Those terminals 10A through 10D may be the same in structure as each other, and connected to IP network 20 through routers 16 and 18 as illustrated so that a call connection may be set up in accordance with the invention between any ones of those terminals 10A through 10D.

The routers 16 and 18 are adapted to select an optimum path on which IP packets are to be conveyed and transmit IP packets including an IP address allotted to a destination to an IP telephone terminal having that destination address. The routers 16 and 18 are installed at the respective sites, and connected to the terminals 10A, 10B and 10C, 10D by respective LANs (Local Area Networks) 19 and 21, which do not require special specifications. The LANs 19 and 21 may be of a 10 Mbps or 100 Mbps Ethernet (trademark). Alternatively, the LANs 19 and 21 may be implemented by an FDDI (Fiber Distributed Data Interface) or ATM (Asynchronous Transfer Mode) network, or of a one-to-one connection protocol, such as PPP (Point-to-Point Protocol).

In the embodiment, the IP network 20 is usually a wide area network (WAN) working on the basis of a TCP/IP (Transmission Control Protocol/Internet Protocol). Terminals, such as IP telephone terminals 10A through 10D, connected to the IP network 20 are identified with the IP addresses allotted thereto, in addition to telephone or subscriber numbers also assigned thereto. IP packets are transferred on the network 20 to destined terminals by means of IP addresses included in headers associated with those packets. The IP network 20 may be the Internet of course, or any types of network adapted for transmitting packets by means of IP addresses as well. For example, IP-VPN (Internet Protocol-Virtual Private Network), broad LAN service, CATV (CAble TeleVision) and frame-relay/ATM/digital leased lines may also be applicable to the network 20.

Figure 1:
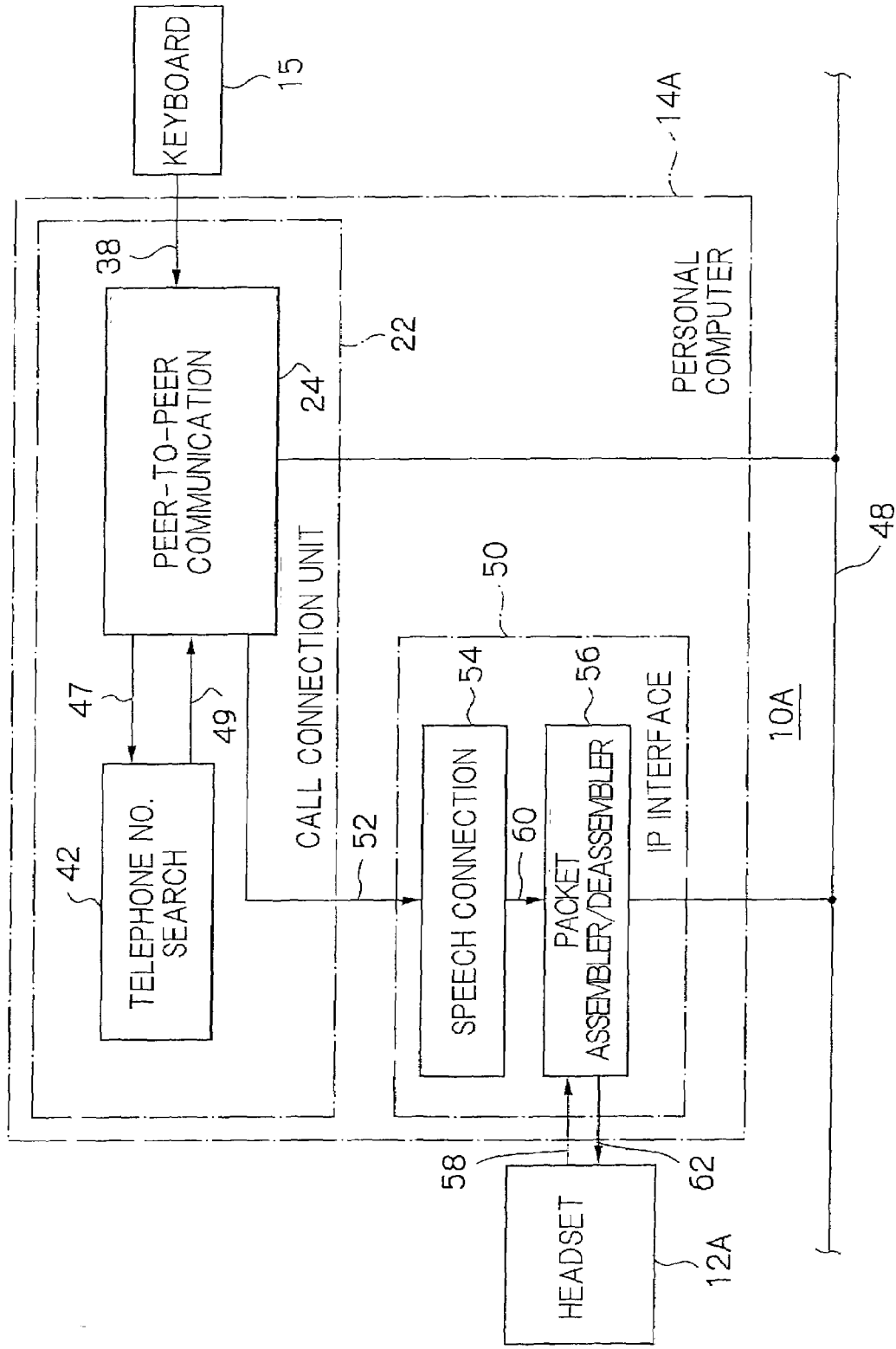
FIG. 1 is a schematic block diagram showing a preferred embodiment of an IP telephone terminal in accordance with the present invention.

Reference will now be made to FIG. 1, which schematically shows an embodiment of the IP telephone terminal 10A, as which the remaining IP telephone terminals 10B, 10C and 10D are of the same structure, and which is therefore a representative of those terminals 10A through 10D. The IP telephone terminal 10a includes a headset 12A including a microphone and a headphone, not shown, and a personal computer 14A. To the personal computer 14A, a keyboard 15 functioning as an input device is interconnected as illustrated. By means of the keyboard 15, an operator may operate software installed in the computer 14A, and enter data such as a telephone, i.e. subscriber, number into the computer 14A. The headset 12A and keyboard 15 are examples of talking device and telephone number input device, respectively, and may be implemented in the form of other types of devices. In addition, as an operating system for implementing the IP telephone function, general-purpose operating systems may be applicable.

The personal computer 14A includes a call connection unit 22, which is adapted, on one hand, to search for a destined IP telephone terminal to be called over the IP network 20. The call connection unit 22 is, on the other hand, adapted to determine whether or not the IP telephone terminal 10A including the connection unit 22 is a destined terminal for which another of the terminals 10B, 10C and 10D, for example, is searching when calling a destination.

The call connection unit 22 comprises a peer-to-peer communication subsection 24, which takes an important role in the embodiment and is adapted to transmit and receive signals on a peer-to-peer connection with an IP telephone terminal preliminarily called, which will be described in detail later. The "peer-to-peer" connection is generally directed to communications with another party as equals. In the more accurate context, however, the peer-to-peer connection is referred to communications with another party without requiring an intermediary. Conventionally, IP telephone terminals are adapted to supply a gatekeeper with the telephone number of a destined IP telephone terminal to have a call connection setup. The illustrative embodiment, however, does not require the procedure of supplying a gatekeeper with telephone numbers. The embodiment does not rely upon the centralized control by a gatekeeper but the concept that both of IP telephone terminals determine by themselves whether or not they are to be appropriately communicated with each other. In other words, the illustrative embodiment has a feature that individual IP telephone terminals autonomously take part of the procedures distributed thereto to perform call connections. Further details will become apparent in the following.

Figure 2:
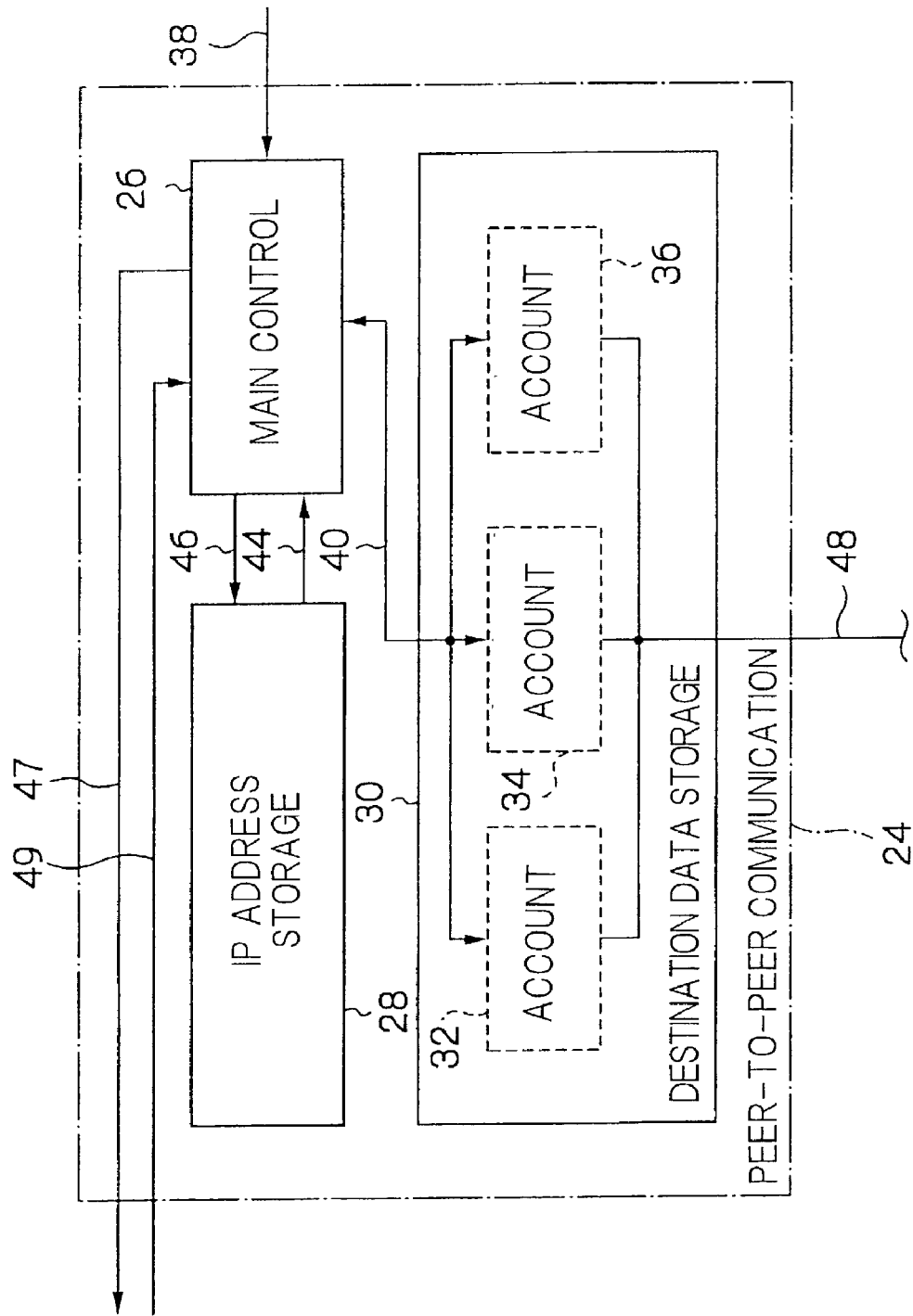
FIG. 2 is a schematic block diagram exemplarily showing a peer-to-peer communication unit shown in FIG. 1.

FIG. 2 shows in a schematic block diagram an exemplary structure of the peer-to-peer communication subsection 24 shown in FIG. 1. The peer-to-peer communication subsection 24 comprises a main control 26, an IP address storage 28 and a destination data storage 30 interconnected as illustrated. In the following, like components are designated with the same reference numerals. The main control 26 is adapted to control the storages 28 and 30, when the terminal 10A either originates or receives a call, to establish a peer-to-peer connection. The IP address storage 28 functions as storing therein the IP addresses of IP telephone terminals which were connected with the IP telephone terminal 10A, i.e. to which a call connection was set up in the past. The destination data storage 30 has a volatile or rewritable storage area, and serves to prepare a temporary account, e.g. 32, 34 and 36, associated with one or more preliminarily called IP telephone terminals in the volatile storage area. Into the accounts 32, 34 and 36, stored are identification data including the telephone number, IP address and the like of the respective, preliminarily called IP telephone terminals. Although in the figure only three accounts 32, 34 and 36 are depicted for simplicity, the destination data storage 30 may have a storage capacity sufficient for those data to be stored for a lot of telephone terminals in the system.

The main control 26 receives, when the terminal 10A originates a call, a telephone number 38 entered by the keyboard 15, and generates a new account, e.g. 32, to store the telephone number therein to proceed to searching for a destined IP telephone terminal having the telephone number 38. In the specification, signals are designated with reference numerals of connections on which the signals appear. When the terminal 10A receives a call terminating thereto, the main control 26 receives a telephone number 40, which was transmitted over the IP network 20 from another IP telephone terminal and has been stored in one account, e.g. 34, to transfer the number 40 to the telephone number search subsection 42, described later, to determine whether or not the terminal 10A per se is a terminal which a calling IP telephone terminal is searching for and seeking to set up a connection with.

The IP address storage 28 is adapted to develop, when the IP telephone terminal 10A originates a call to search for a destined IP telephone terminal, the IP address 44 of the IP telephone terminal to which the telephone number 38 is directed. Additionally, upon a call connection established from the terminal 10A to the destined IP telephone terminal, the IP address storage 28 receives the IP address 46 of the destined terminal to record the latter therein.

The destination data storage 30 is adapted for producing IP packets to be forwarded to a preliminarily called IP telephone terminal and receiving IP packets 48 from the destined terminal at the corresponding account 32, 34 or 36 in order to perform a peer-to-peer communication with the preliminarily called terminal.

Now returning to FIG. 1, the call connection unit 22 includes a telephone number search subsection 42, which is adapted to store therein the telephone, i.e. subscriber number, of the IP telephone terminal 10A per se. The search subsection 42 compares a telephone number 47 transferred from the peer-to-peer communication subsection 24 with the stored telephone number to return the result 49 from the comparison to the communication subsection 24.

The personal computer 14A further comprises an IP interface unit 50, which is adapted to receive, after the search by a peer-to-peer transmission set up by the call connection unit 22 has resulted in a call connection, the IP address 52 of the destined IP telephone terminal to perform a speech transmission following thereto. It is understood that until a call connection is established the transmission and reception of IP packets 48 are dedicated by the call connection unit 22 on a peer-to-peer connection whereas after a call connection is established they are exclusively handled by the IP interface unit 50.

The IP interface unit 50 includes a speech connection subsection 54 and a packet assembler/deassembler 56 connected as shown. The speech connection subsection 54 is adapted for receiving the IP address 52 of a destined IP telephone terminal from the call connection unit 22 when a call connection has been established to the destined terminal, and records the IP address 52 into the header of an IP packet 48 to be transmitted, the header 60 being in turn delivered to the packet assembler/deassembler 56. In order to perform a speech connection, it may not be necessary to specifically design a program sequence therefor, but a general-purpose connection protocol, such as the ITU-T H.323 protocol, may advantageously be applied.

The packet assembler/deassembler 56 is adapted to convert analog speech signals 58 received from the headset 12A into corresponding digital data, and assembles the latter into IP packets 48. More specifically, the speech data 58 are divided into segments of a predetermined period of time, and each of the segmented data is allotted to the header 60 supplied from the speech connection subsection 54 to be assembled into an IP packet 48. The packet assembler/deassembler 56 is further adapted for deassembling, upon having received IP packets 48 transmitted over the IP network 20 from a remote IP telephone terminal, the packets 48 thus received into speech data and converting the speech data into corresponding analog signals 62 to provide the headset 12A with the analog signals 62 in the form of speech signals.

The protocol conversion accomplished by the IP interface unit 50 stated above were traditionally implemented by a so-called gateway. In the illustrative embodiment, however, that is accomplished by the IP interface unit 50. That requires no gateway with the IP telephone searching system to which the illustrative embodiment of the IP telephone terminal is applied, as different over the prior art system.

Figure 3:
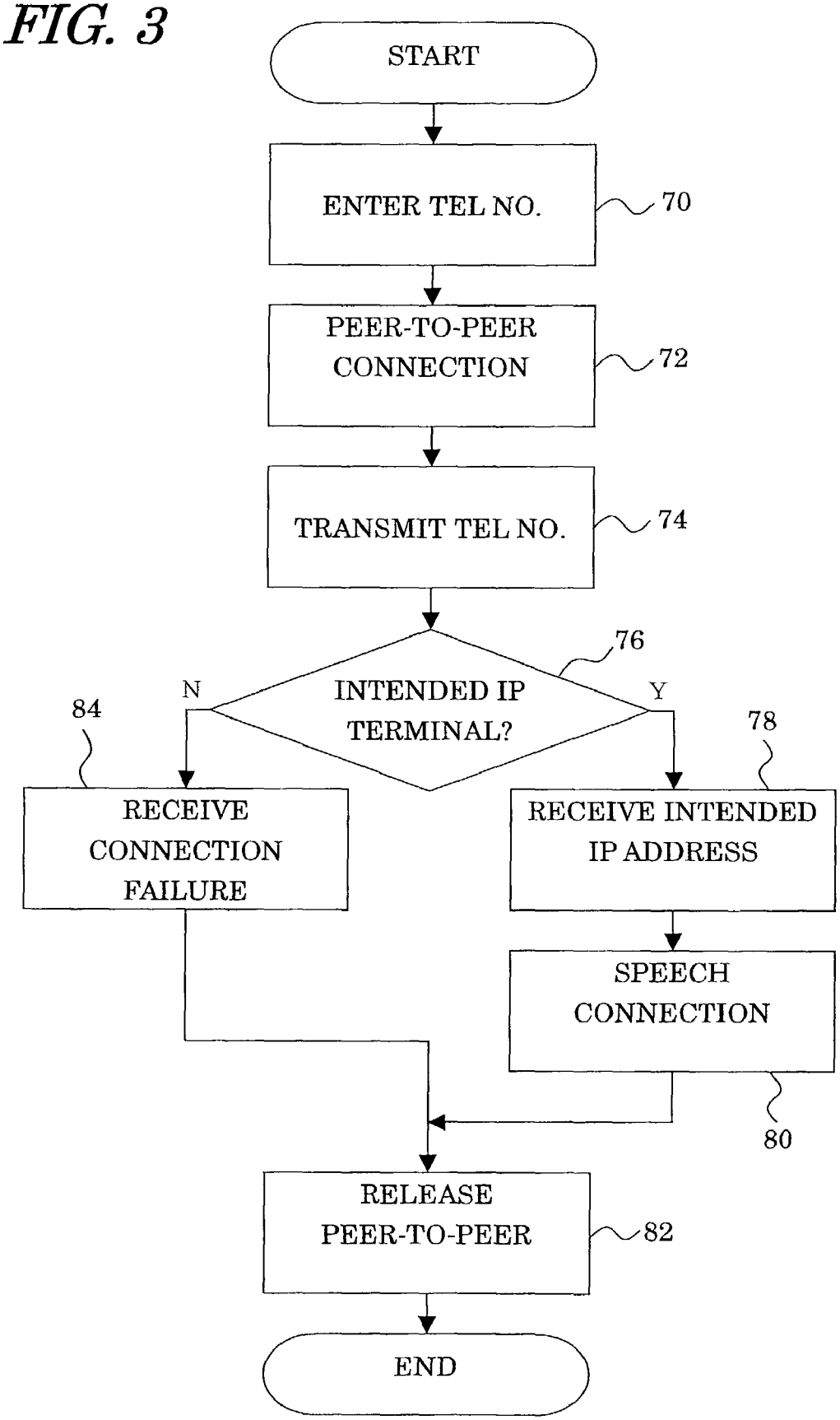
FIG. 3 is a flow chart useful for understanding an operation of the IP telephone terminal when calling.

In operation, with reference to FIG. 3 showing a control flow when the IP telephone terminal 10A originates a call meant for another terminal 10C, for example, what the operator on the calling terminal 10A is aware of is in general the telephone, or subscriber, number of the terminal 10C to be called. If the calling terminal 10A was connected in the past to the terminal 10C to be called, then the calling terminal 10a has the IP address of the terminal 10C to be called stored in the IP address storage 28. In such a case, however, the correspondence of the IP address stored with the destined terminal 10C is not definitely determined. The calling terminal 10A will therefore make access to all the IP telephone terminals having the IP address thereof stored in the IP address storage 28 to interrogate each of them as to whether or not the interrogated terminal is the intended IP telephone terminal 10C, by means of the telephone number entered by the operator as a searching key. In the specification, a call connection originating from a calling IP telephone terminal, 10A in this example, for searching for a destined IP telephone terminal to be called, as stated above, is referred to as a preliminary call or searching connection.

If the calling terminal 10A was connected in the past to the terminals 10B, 10C and 10D, for example, the calling terminal 10A has the address of the terminals 10B, 10C and 10D stored in the IP address storage 28 thereof. When the operator on the terminal 10A originates a call to the terminal 10C, for example, he or she manipulates the keyboard 15 in the step 70 to enter the telephone number of the terminal 10C to be called. The telephone number 38 thus entered is transferred to the main control 26 of the peer-to-peer communication unit 24. The main control 26 makes reference to the IP address storage 28 to fetch the IP address of the terminals to which the calling terminal 10A has been connected. In the instant example, the address of the terminals 10B, 10C and 10*d* are obtained. The main control 26 in turn prepares a corresponding number of accounts 32, 34 and 36 in the destination data storage 30, and stores the IP addresses thus extracted in the respective accounts 32, 34 and 36. The main control 26 then assembles IP packets for requesting the establishment of a peer-to-peer connection for each of the terminals 10B, 10C and 10D to transmit those packets to the respective terminals 10B, 10C and 10*d*. That is the peer-to-peer connection on the one-to-multiple basis as shown in the step 72. The peer-to-peer connection on the one-to-multiple basis is thus established to all the IP telephone terminals to which the calling IP telephone terminal 10A was connected.

When a peer-to-peer connection has been established to the terminals 10B, 10C and 10D, the main control 26 of the calling terminal 10A assembles an IP packet to include the telephone number of the terminal 10C to be called into the packet to transmit the latter to the terminals 10B, 10C and 10D, in the step 74. If any of those terminals 10B, 10C and 10D transmits the IP address thereof in response, in the step 76, this then implies that an intended IP telephone terminal was located or found out. In the instant example, the intended terminal 10C will in response transmit the IP address allotted thereto. With this example, the account 34 formed in the destination data storage 30 to deal with the peer-to-peer connection to the terminal 10C receives the IP address of the intended terminal 10C. From the remaining terminals 10B, 10D, etc., the IP packets indicative of connection failure may be received.

From the account 34, the IP address 40 of the intended IP telephone terminal 10C thus received is transferred to the main control 26. The main control 26 transfers the IP address 52 to the speech connection subsection 54 of the IP interface unit 50. The speech connection subsection 54 will then provide the IP packet assembler/deassembler 56 with the IP address 60 of the intended IP telephone terminal 10C to include the address 60 into the header of packets to be assembled by the assembler/deassembler 56, so as to allow the assembled packets 48 to be transmitted to the destined terminal 10C. The speech connection shown in the step 80 is thus established.

Whenever the speech connection is established, the peer-to-peer connection on the one-to-multiple basis controlled by the peer-to-peer communication subsection 24 is entirely released. Accordingly, from now on, what receives IP packets 48 transmitted from the destined terminal 10C is solely the IP interface unit 50 of the terminal 10A, thus commencing a normal speech connection.

If in the IP network 20 there is found out no terminal which has the telephone number corresponding to that entered by the keyboard 15 of the terminal 10A, at the step 76, then the peer-to-peer communication subsection 24 of the calling terminal 10A receives IP packets indicative of connection failure from the terminals 10B, 10C, 10D, etc., as shown in the step 84. In that situation, the control will then be transferred to the step 82 to release the peer-to-peer connection, so that the call-originating procedure will thus abort with no destination located.

Figure 4:
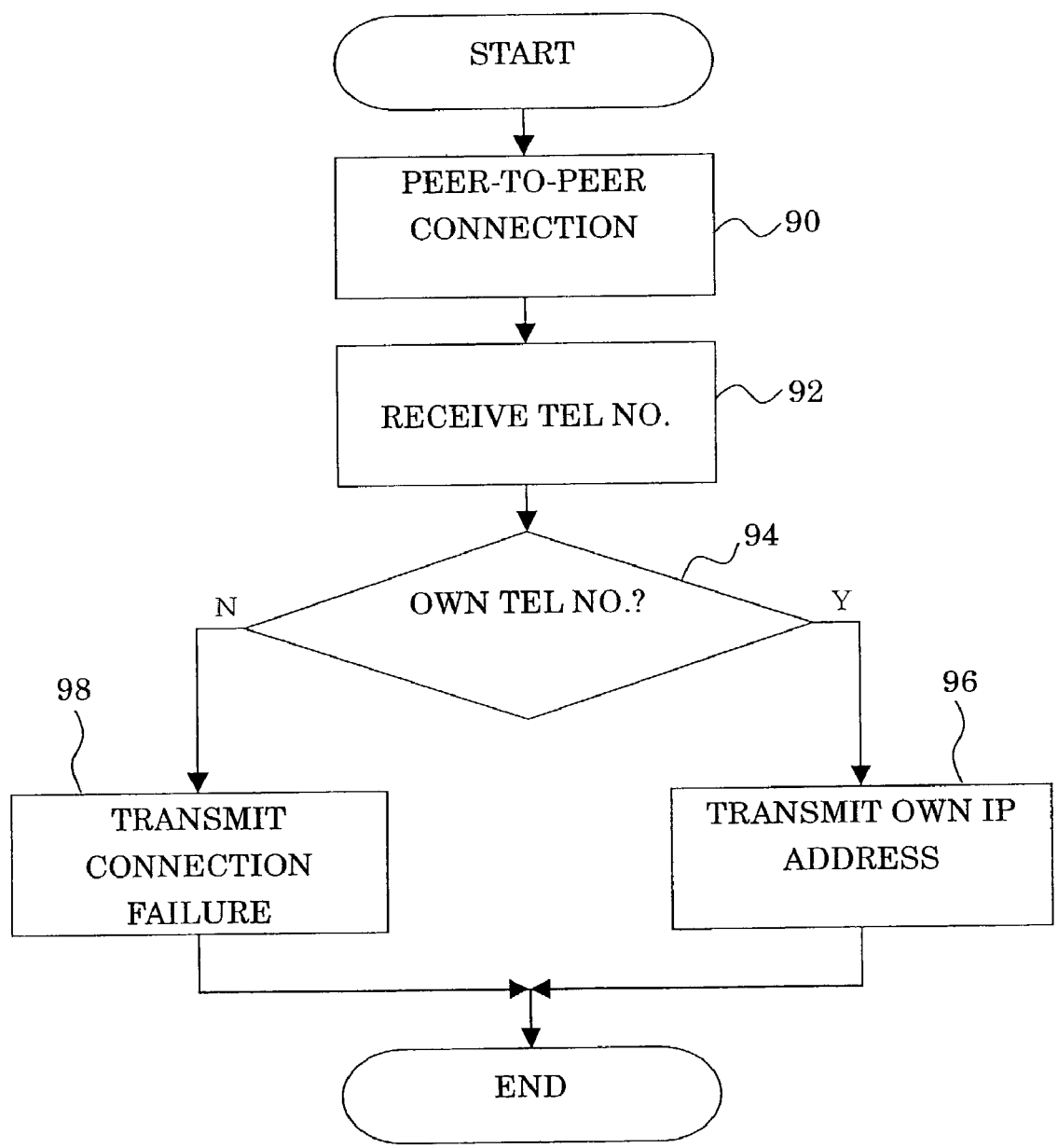
FIG. 4 is a flow chart, similar to FIG. 3, useful for understanding an operation of the IP telephone terminal, when preliminarily called, correspondingly in the sequence shown in FIG. 3.

In response to the procedure shown in and described above with reference to FIG. 3, the preliminarily called IP telephone terminal 10B, 10C and 10D act correspondingly as illustrated in the flow chart shown in FIG. 4. Since the IP telephone terminals 10A through 10D have the same structure, the operation of the preliminarily called IP telephone terminal 10C will be described with reference to FIGS. 1 and 2. The IP telephone terminals 10B, 10C and 10*d*, when having received the IP packet for requesting a peer-to-peer connection from the calling IP telephone terminal 10A in the step 72, generates an account in the destination data storage 30 thereof dedicated for the calling terminal 10A, and accepts the peer-to-peer connection to be established on the one-to-one basis in the step 90. The telephone number transmitted in the step 74 from the calling terminal 10A as a searching key is received by the account formed in the remaining IP terminals 10B, 10C and 10D in the step 92. The main control 26 of the terminals 10B, 10C and 10D develops the telephone number 40 thus received to transfer it to the telephone number search subsection 42.

In the respective terminals 10B, 10C and 10D, the telephone number search subsection 42 in turn compares the telephone number 47 thus received with the telephone number assigned thereto, the result 49 from comparison being transferred to the peer-to-peer communication unit 24. In the instant example, only the terminal 10C will produce the result from the coincidence of the telephone number, the control thus being transferred to the step 96. More specifically, in response to the result 49 from the coincidence, the main control 26 of the peer-to-peer communication unit 24 of the terminal 10C will then transmit their own IP address in accordance with the account specifically prepared for the calling terminal 10A. The IP address thus transmitted will be received by the calling terminal 10A in the step 78 to establish a speech connection accordingly.

Referring again to FIG. 10 showing the embodiment of the IP telephone terminal searching system including the IP telephone terminals, the search of a destined IP telephone terminal accomplished through a peer-to-peer connection in the embodiment removes the necessity of gatekeeper and gateway. In addition, each of the IP telephone terminals merely holds their own data in terms of searching for telephone terminals, so that it takes not so much time for the searching in the respective terminals and it is sufficient to manage and maintain the database in the respective terminals by updating only the data held in by themselves. Those advantages come from the distributed database system. Even when any devices or systems intervening between the calling and interrogated terminals are failed in the network, the searching may be achieved by way of other paths bypassing the failed sites.

Figure 9:
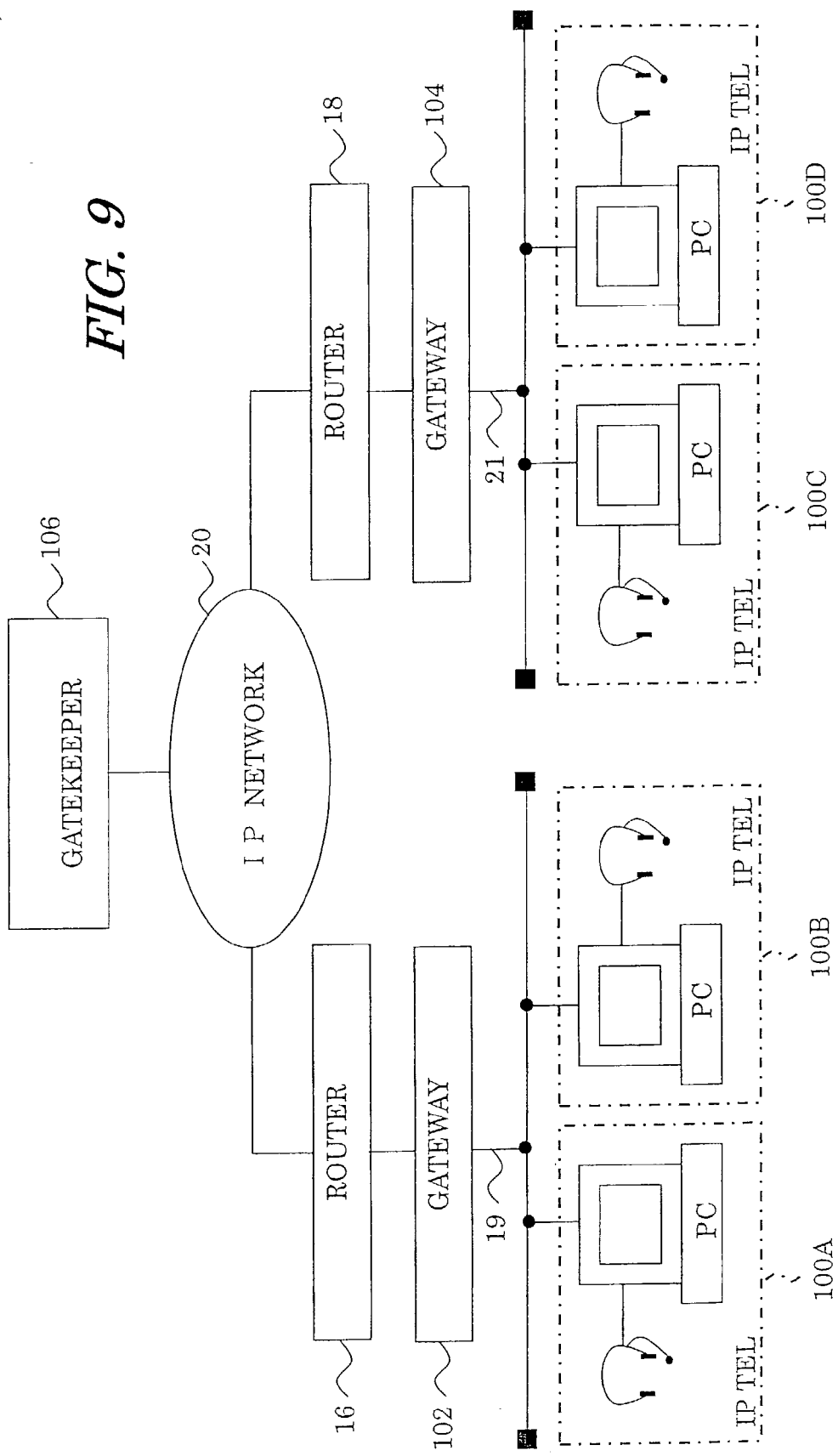
FIG. 9 schematically shows an example of an IP telephone terminal searching system which includes conventional IP telephone terminals and to which applicable is a telephone number searching system according to the invention.

For better understanding the invention, reference will be made to FIG. 9, showing an IP telephone searching system including conventional IP telephone terminals. In the figure, like components are designated with the same reference numerals as in FIG. 10. By contrast to the present invention, conventional IP telephone terminals 100A through 100D required gateways 102 and 104, as well as a gatekeeper 106. This is followed by the fact that conventional IP telephone terminals 100A through 100D, when originating a call, had to make access to the gatekeeper 106, centralized in the network, to obtain therefrom the IP address associated with the telephone number of a destined IP telephone terminal. The prior art IP telephone terminals 100A through 100D did not include circuitry corresponding to the packet assembler/deassembler 56 of the illustrative embodiment functioning protocol conversion between speech signals and IP packets, but instead required the gateways 102 and 104 playing a role of such protocol conversion.

Figure 5:
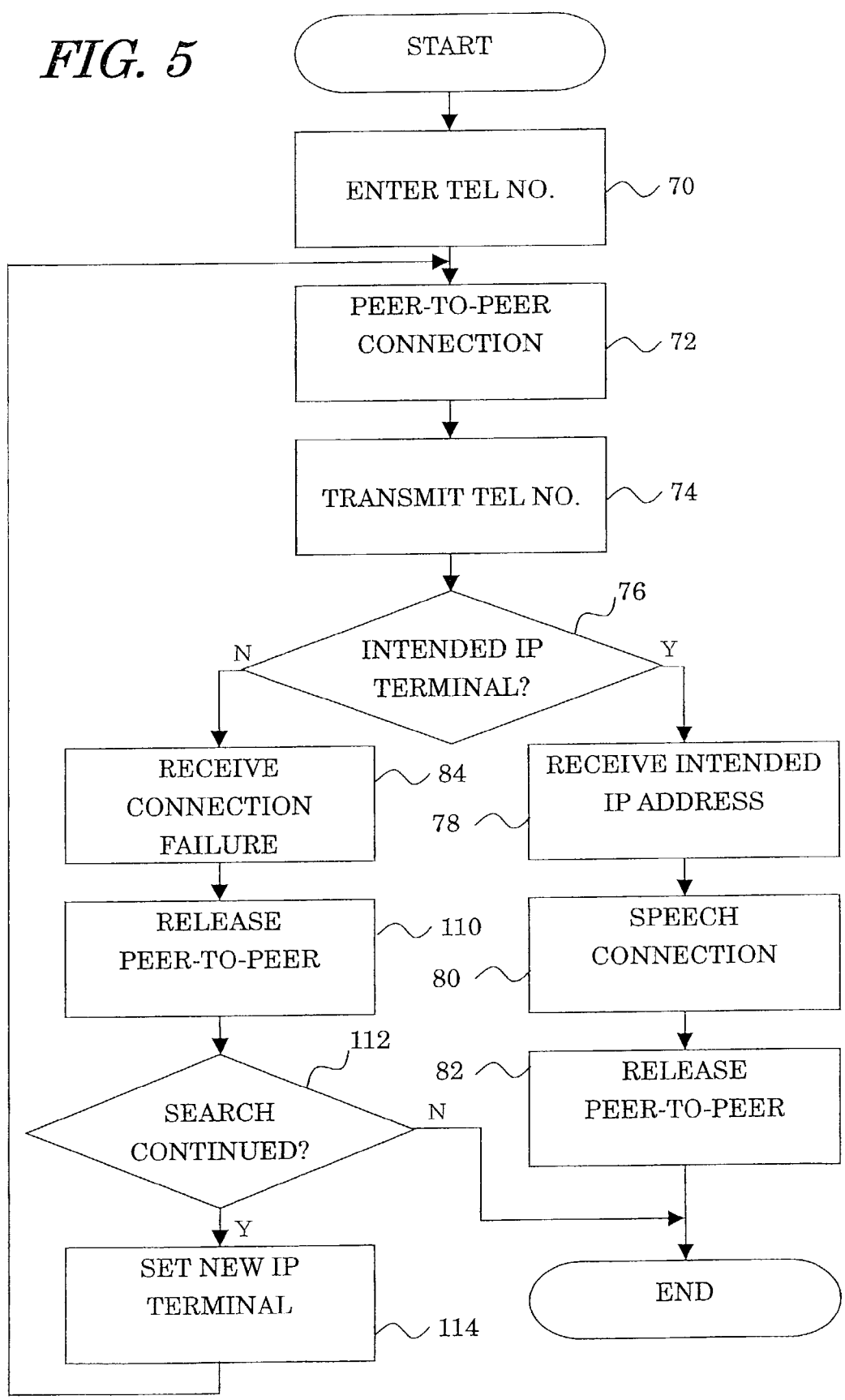
FIG. 5 is a flow chart, similar to FIG. 3, useful for understanding an operation of the IP telephone terminal, when calling, which is improved over the operation shown in FIG. 3 to conduct a broader search.

Now referring to FIG. 5, showing a control flow improved over the control flow shown in FIG. 3 in searching operation performed by the IP telephone terminal 1A, when originating a call, a broader searching operation will be described. In the figure, the same reference numerals are directed to like steps or components. Further in the figure, the same as FIG. 3 are the steps from 70 to 82, and the step 84, which respectively follow the procedures successful and unsuccessful in locating an intended IP telephone terminal to be destined among the IP telephone terminals 10B, 10C and 10D. As different from the flow shown in FIG. 3, when an intended IP telephone terminal is not located, the control is transferred to the step 111 to release the peer-to-peer connection, and thereafter to the step 112 to determine whether or not the searching is to be continued. The decision in the step 112 may be made in accordance with the operator on the calling telephone terminal, or alternatively programmed to proceed to continuing the search when a predetermined condition is satisfied.

If the search is to be continued anyway, then the control transfers to the step 114, in which an account is prepared again in correspondence with a new destined IP telephone terminal in the destination data storage 30 of the calling terminal 10A. The control is then returned to the step 72 to continue further part of the searching. In this case, such a new, destined IP telephone terminal may be set to one which has never been connected in the network. The IP address of such an IP telephone terminal may be recorded in advance in the IP address storage 28, or alternatively, when such a record is not included in the storage 28, a similar IP address may be generated at random or in sequence to those of the IP telephone terminals which the operator has ever called.

Figure 6:
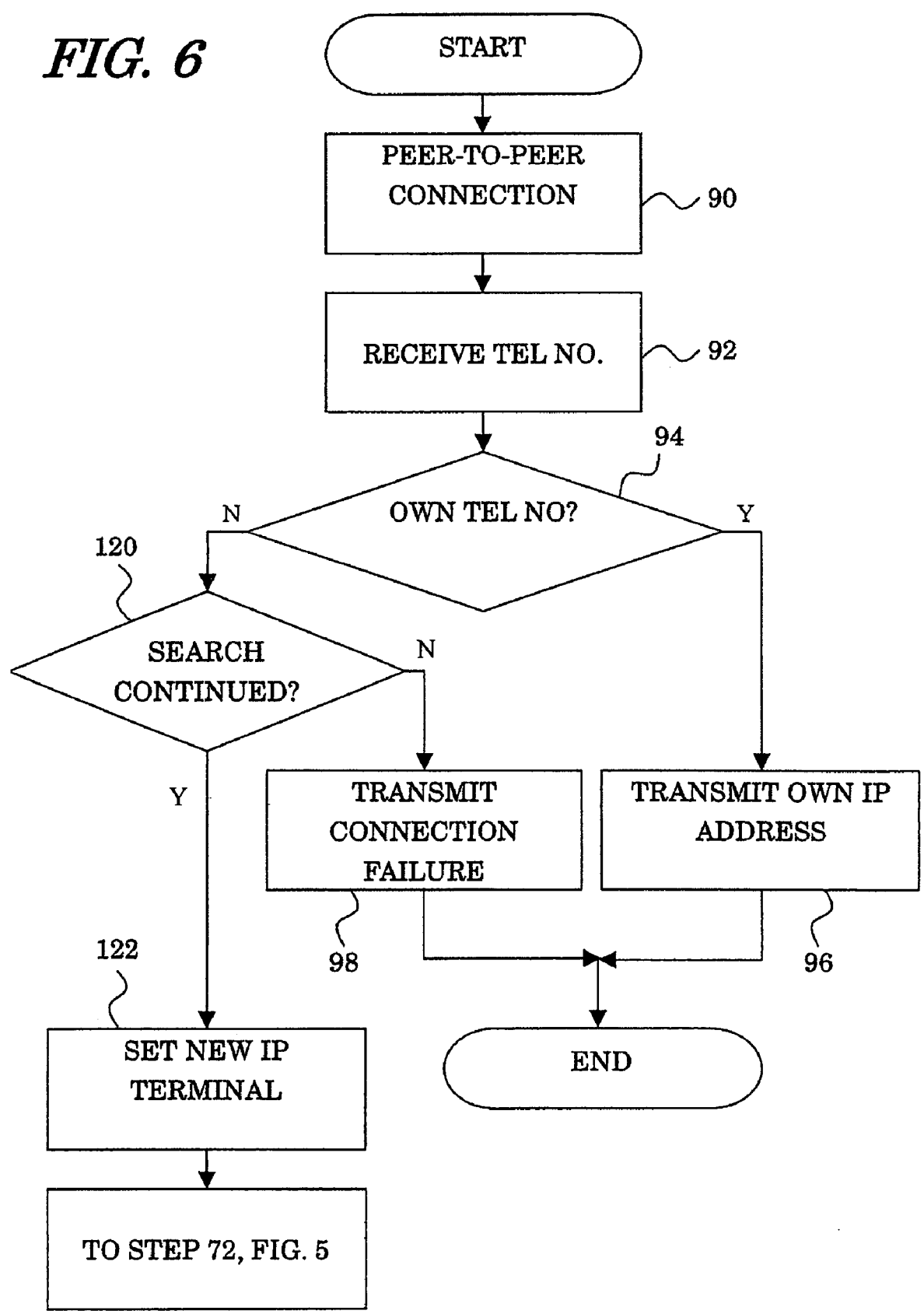
FIG. 6 is a flow chart, similar to FIG. 4, useful for understanding an operation of the IP telephone terminal, when preliminarily called, which is improved over the operation shown in FIG. 4 to conduct a broader search.

Well, FIG. 6 shows a control flow improved in searching operation over the flow shown in FIG. 4 performed by the IP telephone terminals 10B, 10C and 10D, when receiving a possible call to conduct a broader searching operation. In the figure, the same reference numerals are directed to like steps or components. As different from the flow shown in FIG. 4, when a telephone number received is not determined coincident with the telephone number assigned thereto resultantly from the comparison made in the step 94, the control transfers to the step 120 to determine whether or not the further searching is to be continued. If the searching is to be continued, then a new destination is set up in the step 122. More specifically, while the IP telephone terminals preliminarily called holds the peer-to-peer connection to the calling IP telephone terminal 10A, the terminals preliminarily called prepare an account for an IP telephone terminal to which they have ever been connected, or alternatively not connected, in the destination data storage 30 to return the control thereof to the step 72, FIG. 5.

This allows the IP telephone terminals 10B, 10C and 10D preliminarily called to act as calling parties to other IP telephone terminals to set up a peer-to-peer connection on the one-to-multiple basis to the latter, thus enabling a search for an IP telephone terminal to be continued, which the terminal 10A originating the call failed to directly locate. The extent to which the search is conducted thus becomes broader, giving rise to allowing the calling terminal 10A to receive the IP address of an IP telephone terminal, which is found out as located outside the area available to the calling terminal 10A in directly searching for the intended terminal on the peer-to-peer connection, by routing in the opposite direction from the intended terminal thus located.

Figure 7:
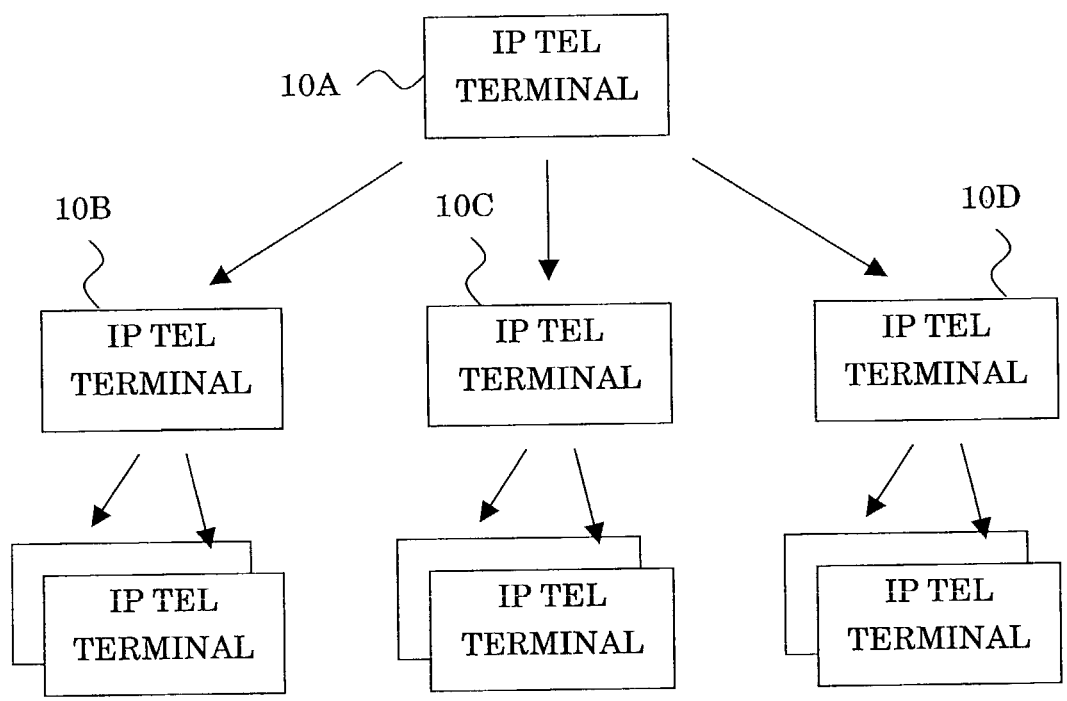
FIG. 7 schematically shows a tree structure with searching paths established by the IP telephone terminal operating, when preliminarily called, according to the control flow shown in FIG. 6.

Referring to FIG. 7, schematically showing the searching paths in the tree structure, which is formed when the preliminarily called IP telephone terminals 10B, 10C and 10D operate following the control flow shown in FIG. 6. As understood from FIG. 7, when the preliminarily called IP terminals follow the control shown in FIG. 6, the searching paths descend deeper in the tree structure. This means that the area searched for extends in vertical direction in the tree structure, thus expanding in a chain linkage.

When the calling terminal 10A operates in accordance with the control flow shown in and described with reference to FIG. 5 in the situation stated above, the searching paths in the tree structure having the calling terminal 10A at its top as shown in FIG. 7 will be formed in multiple. This means that the searching area extends in its horizontal direction in the tree structure. In accordance with the illustrative embodiment of the IP telephone terminal searching system, a search can be conducted on a lot of unspecified IP telephone terminals, thus the searching area being allowed to expand in vertical and horizontal directions by any of the IP telephone terminals.

The embodiments discussed above have the feature of peer-to-peer connection incorporated into IP telephone terminals. Alternatively, the peer-to-peer communication unit, like the subsection 24, may be incorporated into the gatekeeper 106, FIG. 9. In such an application, the system requires a gatekeeper such as shown in FIG. 9, being different from the system shown in FIG. 10. Not specifically shown, with such an application, the gatekeeper 106 would include the peer-to-peer communication unit, like the subsection 24, which is adapted to transmit and receive data to and from one or more IP telephone terminals on a peer-to-peer connection. The peer-to-peer communication unit is adapted to receive a telephone number from a calling IP telephone terminal. The gatekeeper 106 is, in such an application, not be adapted to conduct a search for an intended IP telephone terminal. The telephone number thus received by the peer-to-peer communication unit will be transmitted to one or more IP telephone terminals which are controlled by that gatekeeper 106 and will conduct a search for the intended IP telephone terminal. From the searching, when an IP telephone terminal having the intended telephone number is located or found out, the IP address of that terminal is in turn transmitted to the gatekeeper 106 by its peer-to-peer communication unit, thereafter being transmitted to the calling IP telephone terminal.

In the application where the gatekeeper 106 includes the peer-to-peer communication unit, like the subsection 24, one or more IP telephone terminals which are under the control of the gatekeeper 106 conduct the searching of destined IP telephone terminals. In the application, the gatekeeper 106 still has to maintain information on which IP telephone terminals are under the control thereof, but it has the function of searching for IP telephone terminals carried by the peer-to-peer communication unit incorporated therein. This obviates the provision of database listing the correspondence of the telephone numbers with the IP addresses of all the IP telephone terminals which the conventional gatekeeper 106 controlled. In addition, the extent to which the searching scheme established by the illustrative embodiments can flexibly be enlarged, so that the gatekeeper 106 is able to conduct a search even for IP telephone terminals outside the area the gatekeeper 106 controls.

Figure 8:
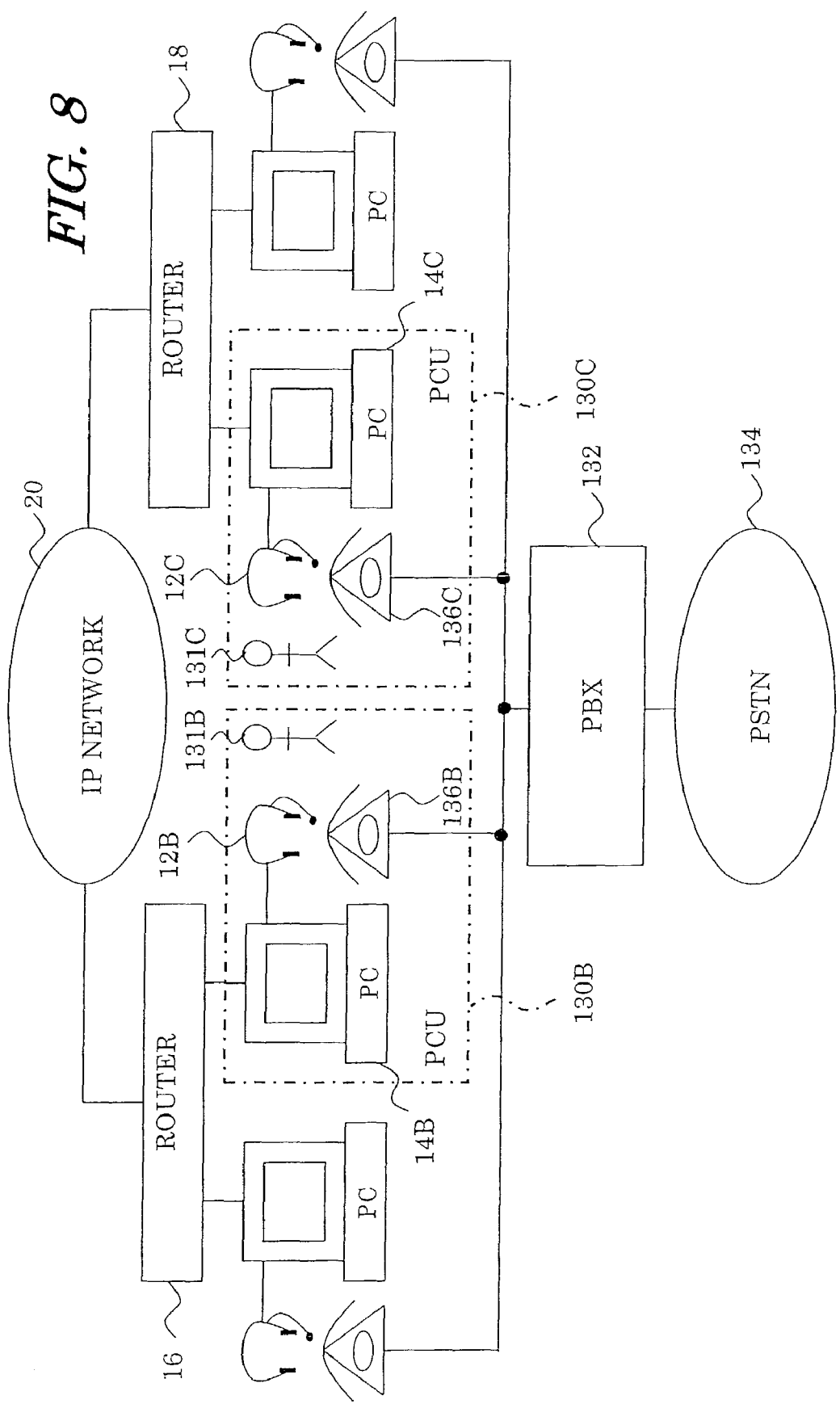
FIG. 8 schematically shows an IP telephone terminal searching system applied to a telephone number searching service in a public switched telephone network in accordance with the invention.

Referring now to FIG. 8, an embodiment will be described in which the IP telephone terminal searching system in accordance with the invention is applied to the telephone number searching service of a public switched telephone network (PSTN) 134. The illustrative embodiments described earlier are directed to searching for the IP address of destined IP telephone terminals by means of telephone or subscriber numbers as a searching key. The present invention is however also applicable to using any personal information other than telephone numbers as a searching key, and what are to be obtained from the search is not restricted to IP addresses.

With the service illustrated in FIG. 8, persons 131B and 131C are allotted to personal control units (PCUs) 130B and 130C, respectively. The personal control units 130B and 130C respectively include personal computers (PCs) 14B and 14C and headsets 12B and 12C, forming the IP telephone terminals 10B and 10C, FIG. 10, as well as telephone sets 136B and 136C, which may be conventional ones accommodated in the public switched telephone network 134 through a private branch exchange (PBX) 132. For description purpose, assume that one person 131B, who wishes to call the other person 131C, is not aware of the telephone number assigned to the telephone set 136C to be called, but personal information, such as the name or identification number in a company, particular to, and sufficient for identifying, the person 131C. The service of the illustrative embodiment allows the one person 131B to call the conventional telephone set 136C associated with the other person 131C by means of personal information particular to the latter as a searching key over the public switched telephone network 134.

That service mentioned above can be implemented by the peer-to-peer connection described above with reference to the earlier-described illustrative embodiments. Specifically, the IP telephone terminals 10B and 10C are adapted to store such personal information, rather than telephone numbers for IP telephone switching, available as searching keys. That enables the IP telephone terminal 10B to enter personal information instead of telephone numbers as searching keys, and to set up a peer-to-peer connection to conduct a search for the IP address of the IP telephone terminal 10C associated with the person 131C to be called. This application may easily be adapted to locate, in addition to IP addresses, telephone or subscriber numbers available in the public switched telephone network 134 accommodating the telephone set 136C associated with the called person 131C.

The telephone or subscriber number thus extracted of the person 131C to be called may be indicated on the display unit, not shown, of his or her IP telephone terminal 10B so as to permit him or her 131B to originate a call to the called party 131C over the public switched telephone network 134.

The present invention may thus advantageously be applicable not only to IP telephone networks but also extensively to telephone number searching services utilized in conventional public switched telephone networks.

The illustrative embodiments are directed to searching for IP addresses and/or telephone numbers. The invention is however not restricted to those subjects to be searched for, but may be also applicable to any other information particular to telephone terminals, such as email addresses, post addresses, and website addresses.

The entire disclosure of Japanese patent application No. 2001-353930 filed on Nov. 20, 2001, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A first IP (Internet Protocol) telephone terminal connectable to any of a plurality of second IP telephone terminals over an IP network, each of the first and second IP telephone terminals having a telephone number and an IP address allotted thereto, said first IP telephone terminal comprising:
   a communication section for transmitting and receiving data over the IP network to and from the plurality of second IP telephone terminals on a peer-to-peer connection basis, said communication section transmitting the telephone number of a desired one of said second IP telephone terminals over the IP network to more than one of said second IP telephone terminals when said first IP telephone terminal originates a call to the desired one of said second IP telephone terminals; and
   a comparing section for comparing a telephone number received over the IP network by said communication section from one of said second IP telephone terminals with the telephone number allotted to said first IP telephone terminal to produce a result from the comparison in dependence upon whether or not the telephone number received coincides with the telephone number allotted to said first IP telephone terminal.

2. The first IP telephone terminal in accordance with claim 1, wherein said communication section transmits, when the result from comparison indicates that the telephone number received does not coincide with the telephone number allotted to said first IP telephone terminal, the telephone number received by said communication section to a second IP telephone terminal that has previously been connected to said first IP telephone terminal;
   whereby a search is allowed to continue for the second IP telephone terminal to which the call connection is to be established.

3. The first IP telephone terminal in accordance with claim 2,
   wherein said communication section comprises a storage circuit for storing therein the IP address of the second IP telephone terminal that has previously been connected to said first IP telephone terminal; and
   wherein said communication section transmits, when the result from comparison indicates that the telephone number received does not coincide with the telephone number allotted to said first IP telephone terminal, the telephone number received by said communication section to the IP telephone t terminal having the IP address stored in said storage circuit.

4. The first IP telephone terminal in accordance with claim 1, wherein said communication section transmits and receives the data in a form of IP packets, said first IP telephone terminal further comprising:
   a port for sending and receiving an analog speech signal;
   a packet assembler/deassembler for converting protocol between the analog speech signal and the IP packets; and
   a call connection section for transmitting the IP packets including an IP address received by said communication section to thereby establish a call connection over the IP network.

5. The first IP telephone terminal in accordance with claim 1, wherein said communication section is operative in response to the result from the comparison for transmitting the IP address allotted to said first IP telephone terminal over the IP network when the result from the comparison indicates that the telephone number received coincides with the telephone number allotted to said first IP telephone terminal.

6. A first IP (Internet Protocol) telephone terminal connectable to any of a plurality of second IP telephone terminals over an IP network, the first IP telephone terminal and each of the plurality of second IP telephone terminals having a telephone number and an IP address allotted thereto, wherein the first IP telephone terminal, when originating a call to a desired one of the second IP telephone terminals, transmits the telephone number allotted to the desired one of the second IP telephone terminals, said first IP telephone terminal comprising:
   a communication section for transmitting and receiving data to and from the plurality of second IP telephone terminals on a peer-to-peer connection basis, the data including a telephone number and an IP address; and
   a comparing section for comparing the telephone number received by said communication section with the telephone number allotted to said first IP telephone terminal to produce a result from the comparison in dependence upon whether or not the telephone number received coincides with the telephone number allotted to said first IP telephone terminal,
   wherein said communication section transmits, when the result from comparison indicates that the telephone number received does not coincide with the telephone number allotted to said first IP telephone terminal, the telephone number received by said communication section to one of the plurality of second IP telephone terminals;
   whereby a search is allowed to continue from the first IP telephone terminal.

7. A system for searching for an intended one of a plurality of IP (Internet Protocol) terminals connectable to any other of the plurality of IP terminals over an IP network, each of the plurality of IP terminals having particular identification information and an IP address allotted thereto, each of said IP terminals comprising:
   a communication section for transmitting and receiving data over the IP network to and from a plurality of other IP terminals on a peer-to-peer connection basis, the data transmitted by the communication section of a given one of the IP terminals over the IP network to the plurality of other IP terminals including the identification information allotted to a desired one of the other IP terminals; and
   a comparing section for comparing identification information received over the IP network from one of the other IP terminals with the identification information particular to said given one of the IP terminals.

8. The system in accordance with claim 7, wherein said communication section of said given one of the IP terminals is operative in response to the result from the comparison for transmitting the IP address allotted to said given one of the IP terminals over the IP network when identification information received by the given one of the IP terminals coincides with the identification information particular to said given one of the IP terminals.

9. A method of searching for an intended one of a plurality of IP (Internet Protocol) telephone terminals connectable to any other of the plurality of IP telephone terminals over an IP network, comprising the steps of:

allotting to each of the plurality of IP telephone terminals a telephone number and an IP address;

transmitting over the IP network from a first one of the plurality of IP telephone terminals to a plurality of other IP telephone terminals, when originating a call, the telephone number allotted to a desired second one of the plurality of IP telephone terminals on a peer-to-peer connection basis;

receiving the telephone number transmitted over the IP network in said step of transmitting by the second one of the plurality of IP telephone terminals;

comparing the telephone number received by the second IP telephone terminal with the telephone number allotted to the second IP telephone terminal, the comparing step being conducted in the second IP telephone terminal;

transmitting the IP address allotted to the second IP telephone terminal over the IP network when a result from said step of comparing indicates that the telephone number received by the second IP telephone terminal coincides with the telephone number allotted to the second IP telephone terminal; and establishing a call connection over the IP network from the first IP telephone terminal to the second IP telephone terminal by means of the IP address transmitted.

10. The method in accordance with claim 9, further comprising the step of transferring, when a telephone number received by the second IP telephone terminal does not coincide with the telephone number allotted to the second IP telephone terminal, the telephone number received to a third one of the plurality of IP telephone terminals which has previously been connected to the second IP telephone terminal; whereby a search is allowed to continue for the IP telephone terminal to which a call connection is to be established.

11. The method in accordance with claim 10, further comprising the step of storing the IP address of the third IP telephone terminal in the first IP telephone terminal.

12. A method of searching for an intended one of a plurality of IP (Internet Protocol) telephone terminals connectable to any other of the plurality of LIP telephone terminals over an IP network, comprising the steps of:

allotting each of the plurality of IP telephone terminals to a telephone number and an IP address;

transmitting from a first one of the plurality of IP telephone terminals, when originating a call, the telephone number allotted to a second one of the plurality of IP telephone terminals on a peer-to-peer connection basis;

receiving the telephone number transmitted in said step of transmitting by the second one of the plurality of IP telephone terminals;

comparing the telephone number received by the second one of the IP telephone terminals with the telephone number allotted to the second IP telephone terminal;

transmitting the IP address allotted to the second one of the IP telephone terminals over the IP network when a result from said step of comparing indicates that the telephone number received by the second one of the IP telephone terminals coincides with the telephone number allotted to the second one of the IP telephone terminals;

establishing a call connection over the W network from the first one of the IP telephone terminals to the second one of the IP telephone terminal by means of the IP address transmitted, and transferring, when the result from said step of comparing indicates that a telephone number received by the second one of the IP telephone terminals does not coincide with the telephone number allotted to the second one of the IP telephone terminals, the telephone number received in said step of receiving to a third one of the plurality of IP telephone terminals;

whereby a search is allowed to continue for a call connection that is to be established from the first IP telephone terminal.

\* \* \* \* \*